United States Patent [19]

Cajigas

[11] 4,289,789
[45] Sep. 15, 1981

[54] INSTANT YOGURT DRINK COMPOSITION

[75] Inventor: Stanley D. Cajigas, Point Pleasant, N.J.

[73] Assignee: M P Food Technology, Inc., Fairfield, N.J.

[21] Appl. No.: 51,820

[22] Filed: Jun. 25, 1979

[51] Int. Cl.³ .................. A23C 9/12; A23C 23/00
[52] U.S. Cl. .................................... 426/61; 426/41; 426/43; 426/583
[58] Field of Search .................. 426/43, 61, 34, 41, 426/583, 580, 573, 576

[56] References Cited

U.S. PATENT DOCUMENTS

| | | | |
|---|---|---|---|
| 4,058,636 | 11/1977 | Igoe | 426/580 X |
| 4,066,794 | 1/1978 | Schur | 426/43 X |
| 4,081,567 | 3/1978 | Haber | 426/583 |
| 4,110,476 | 8/1978 | Rhodes | 426/43 X |

*Primary Examiner*—David M. Naff
*Attorney, Agent, or Firm*—Hopgood, Calimafde, Kalil, Blaustein & Judlowe

[57] ABSTRACT

An instant powdered yogurt drink is prepared containing lactobacillus culture, deactivated yogurt powder, a thickener, a hydrocolloid gum and a food acidulent. A preferred thickener, hydrocolloid gum and acidulent is carboxy methyl cellulose, locust bean gum and a mixture of acid whey and citric acid, respectively.

2 Claims, No Drawings

INSTANT YOGURT DRINK COMPOSITION

CROSS-REFERENCE TO RELATED APPLICATION

This application discloses subject matter which, in various particulars, is similar to that disclosed in copending U.S. patent application Ser. No. 051,819, filed concurrently herewith by Stanley D. Cajigas and entitled "Instant Yogurt and Process Therefor". The entire disclosure of this patent application is hereby incorporated by reference.

BACKGROUND OF THE INVENTION

1. Field of the Invention

This invention relates generally to food compositions and more particularly to solid compositions in dry particulate form which may be reconstituted by admixture with milk to provide a liquid yogurt drink which has high nutritional and medicinal value.

2. Summary of the Prior Art

Yogurt is a form of fermented milk curdled to a smooth, creamy or custard-like consistency by lactic acid-producing microorganisms. The production of natural yogurt entails the implant of a beneficial culture of *Lactobacillus bulgaricus* and sometimes *Lactobacillus acidophilus* in milk which is then allowed to incubate until these particular species of bacilli establish the proper pH in the milk, after which the milk is chilled to inhibit growth of undesirable microflora.

Because of rising public demand, yogurt is now factory-produced on a large scale and widely sold in supermarkets. But consumers sometimes find it inconvenient to purchase the fresh product or that the product is too costly. However, electrically-heated yogurt makers for do-it-yourselfers are also available so that yogurt can be made at home to suit individual taste. In producing yogurt at home, a yogurt starter in the form of plain yogurt or a commercially-available dried yogurt culture is added to whole or skimmed milk. But whether yogurt is factory-produced or home-made, the processing thereof is time consuming, for it takes many hours of fermentation under proper conditions for the natural yogurt to develop fully. Moreover, both products are highly perishable and require refrigeration for their period of freshness (up to about a week).

When yogurt containing an active culture is consumed, some bacilli pass unharmed through the stomach, for these species favor an acid medium and are therefore not totally destroyed by gastric juices. But when the bacilli find their way into the intestines, they may implant a favorable flora. In any case, whether or not an implant is effected, beneficial vitamins are ingested.

Yogurt is believed to have medicinal value in the control of intestinal fermentation in that it contributes bacteria which establish themselves in the lower intestine and predominate over putrefactive types. Because of this characteristic, yogurt is often prescribed to patients who are required to take large doses of antibiotic drugs. These drugs, as a side effect, act to kill beneficial intestinal bacteria, and it is often necessary, therefore, to replenish such bacteria.

Yogurt drinks have also become popular. Such drinks may be prepared by mixing yogurt with milk or fruit juice in a blender. Such drinks require the availability of yogurt, however, The main value of an instant yogurt drink as against a natural yogurt drink resides in its convenience and is based on practical considerations. There are many situations in which a consumer does not have ready access to a supermarket, dairy, or other facility carrying natural yogurt. While the consumer can, if necessary, make yogurt at home, this is a time-consuming operation requiring some degree of skill and also dictating the use of refrigeration to chill and store the yogurt. But even when refrigerated, natural yogurt has a limited life. One cannot safely stock a refrigerator with a large supply of natural yogurt, for in about a week the entire supply might no longer be edible.

Yogurt or yogurt-like compositions are disclosed in U.S. Pat. Nos. 3,080,236; 3,128,190; 3,897,307; 3,917,875; 3,932,680; 3,950,544; 3,955,009; 4,066,792; 4,066,794; 4,081,567; and 4,110,476. Yogurt or yogurt-like drinks are disclosed in U.S. Pat. Nos. 4,081,567 and 4,110,476.

The search has continued for improved instant yogurt compositions in dry particulate form which may be conveniently reconstituted to form a yogurt drink. This invention was made as a result of that search.

OBJECTS AND SUMMARY OF THE INVENTION

Accordingly, it is a general object of the present invention to avoid or substantially alleviate the above problems of the prior art.

Another object of this invention is to provide an instant powdered composition that requires no refrigeration and has a prolonged shelf life, and which may be reconstituted to form a yogurt drink.

Still another object of the present invention is to provide a process for preparing such an instant powdered composition.

Other objects and advantages of the present invention will become apparent from the following summary and description of the preferred embodiments of the present invention.

In one aspect, the present invention provides an instant powdered composition which may be reconstituted to form a yogurt drink. This composition comprises a mixture of deactivated yogurt powder, Lactobacillus culture, at least one thickener selected from the group consisting of carboxy methyl cellulose and a cold water soluble gum, a hydrocolloid gum, and a food acidulent.

In another aspect, the present invention provides a process for preparing the above-identified instant powdered composition. This process comprises admixing the above-identified ingredients to form a free flowing instant powdered composition.

DESCRIPTION OF THE PREFERRED EMBODIMENTS

Yogurt flavor may be imparted to the composition of the present invention by adding Latobacillus culture and deactivated yogurt powder. Yogurt powder is dehydrated and may be of the type produced and sold by Beatrice Foods, National Dairy, or other large suppliers of yogurt powder. Or, it may be yogurt powder manufactured directly for use and production according to standard evaporation and drying techniques. While yogurt powder is made from natural yogurt containing an active culture, the processing of the natural yogurt with heat to remove all moisture therefrom acts to destroy the culture. Hence, yogurt powder is in the deactivated state, i.e., most of the active culture has been destroyed by the processing, although some of the culture still remains active. The yogurt powder may be dried by freeze drying, spray drying, roller drying or any other commercial drying technique. The preferred yogurt powder is spray dried.

The amount of dehydrated yogurt powder may vary widely but may be generally from about 1 to about 1 to about 40, typically from about 10 to about 35, and preferably from about 20 to about 30 percent by weight of the total composition.

Dried Lactobacillus culture is also commercially available. It is usually used as a culture for the production of natural yogurt. For purposes of inclusion in a blend in accordance with the invention, the dried culture in which the bacilli are in the dormant state and are activated when water is added to the preparation must be such that it has sufficient stability for storage at room temperatures.

To this end, use may be made of stabilized dried cultures of lactic acid-producing bacteria of the type described in U.S. Pat. No. 3,897,307, the disclosure of which is hereby incorporated by reference.

Dried Lactobacillus culture serves, when ingested, to promote the growth of intestinal bacteria which are beneficial and hence imparts to the product the medicinal qualities of natural yogurt.

The amount of Lactobacillus culture used with respect to the rest of the composition may vary widely, although generally an amount of from about 0.01 to about 5, typically from about 0.02 to about 1.5, and preferably from about 0.03 to about 0.5 percent by weight of the total dry composition may be employed.

The instant composition also contains a food acidulent which is added in order to provide the acidic taste typical of yogurt. The food acidulent may be a food grade acid such as, e.g., fumaric, adipic, citric, tartaric, malic, or succinic, either in the anhydrous or the hydrated state, or a mixture of two or more of the foregoing. A preferred food acidulent is acid whey. This particular food acidulent is preferred because it not only provides the acid flavor characteristic of yogurt but also provides an increase in protein content to the dry mixture.

The acid whey is also preferred for use in the present invention when natural flavoring agents which are colored (such as strawberry) are used in the composition. The acidity of the whey protects the system against color change.

Whey is the part of milk left over after manufacturing cheese. It represents 90% on the average of the output of the cheese plant. It is the largest by-product of the dairy industry and world-wide output is many millions of tons annually. This represents a large source of high value protein which has been under utilized as a protein source and in many cases simply discarded.

A particularly preferred food acidulent is a mixture of acid whey and citric acid. This mixture is particularly preferred because it combines the above-noted advantages of acid whey with the fact that the total amount of acid in the mixture may be regulated using citric acid.

The amount of food acidulent that may be used in the dry composition of the present invention should be sufficient to adjust the pH of the system when the dry blend is combined with water to from about 3.5 to about 4.5. If the pH is beyond that required to produce the foregoing range, the product may be coarse in texture, indicative of protein reaction.

The amount of food acidulent may be generally from about 10 to about 50, typically from about 12 to about 30, and preferably from about 15 to about 25% by weight of the total dry composition. When acid whey is used as the food acidulent, the amount of acid whey which should be used depends upon the amount of lactic acid contained within the acid whey. The greater the amount of lactic acid, the smaller the amount of acid whey needed.

The Lactobacillus culture may be provided to the composition of the present invention by innoculating the food acidulent, e.g., the acid whey with the Lactobacillus culture.

The thickener used in the present invention may be selected from the group consisting of carboxy methyl cellulose and a cold water soluble gum. Mixtures of two or more thickeners may also be used.

The cold water soluble gums include xanthan gum and guar gum, although other cold water soluble gums may also be used. Carboxy methyl cellulose is a preferred thickener.

The amount of thickener may vary widely, but generally an amount of from about 0.1 to about 10, typically from about 0.3 to about 5, and preferably from about 0.5 to about 2% by weight thickener based upon the weight of the total dried composition may be employed.

The hydrocolloid gum useful in the present invention is preferably selected from the group consisting of locust bean gum, guar gum, xanthan gum and mixtures thereof. The hydrocolloid gum is added to aid in increasing the viscosity when the mix is first reconstituted with water (or with water and milk) and to provide body and texture to the finished product. Preferably locust bean gum is employed.

An acceptable guar gum is Jaguar A-20-A produced by Stein Hall Company of New York, N.Y. The guar gum is preferably used in conjunction with xanthan gum for additional viscosity control. An example of a suitable xanthan gum is Keltrol F, manufactured by the Kelco Company.

The ratio of guar gum to xanthan gum is typically in the range of from about 2:1 up to about 10:1 with a preferred ratio of guar gum to xanthan gum of about 5:1

Another viscosity control agent which may also be used is carrageenan, for example, Gelcarin GH, produced by the Marine Colloids Corporation.

The amount of hydrocolloid gum may vary widely but generally an amount of from about 0.1 to about 20, typically from about 0.5 to about 10, and preferably from about 1 to about 3% by weight of the total dried composition may be employed.

Locust bean gum is the preferred hydrocolloid gum because it above all delays the acid in the dry composition from attacking and coagulating the milk. The locust bean gum provides a slow controlled coagulation of the milk without the need for any kind of buffer salt. Locust bean gum is preferred over guar or xanthan gum because the latter two gums present flavor problems which are not encountered with locust bean gum. Locust bean gum also protects the thickener from settling out at the isoelectric point.

The particle size of the hydrocolloid gum should be considered when choosing a hydrocolloid gum for the present invention. For example, for locust bean gum, a particle size corresponding to generally from about 80 to about 250, and preferably from about 150 to about 230 mesh should be employed. Locust bean gum which has a particle size less than about 80 mesh is too coarse and does not provide proper protein protection. Locust bean gum which has a particle size greater than about 250 mesh is hard to obtain because the grinding necessary to obtain that fine a particle size may result in the burning up of the gum.

The hydrocolloid gum such as the locust bean gum is also preferably clarified—i.e., it is dissolved in solution and then the solution is filtered to remove insolubles which tend to give the gum a beany note.

Other ingredients may also be added to the composition of the present invention. For example, a sweetener may be added. Such sweeteners include sucrose and dextrose, although other sugars such as corn syrup solids, lactose, etc., may also be used. Such sugars may be employed singly or in combination.

Moreover, artificial sweeteners such as, for example, edible saccharin salts, dipeptide salts and the like may be included in the dry mix to replace all or part of the sugar.

A preferred sweetener is a combination of fructose and sucrose. Fructose has a 50% greater ability to sweeten than sucrose and it is easy to assimilate, particularly for someone such as a diabetic who has sugar problems. The use of all fructose is economically undesirable, however, since sucrose is much cheaper than fructose. Accordingly, a combination of fructose and sucrose may be used in order to maximize economy and minimize total caloric intake.

The amount of sweetener may vary widely, but generally an amount of from about 10 to about 60, typically from about 30 to about 55, and preferably from about 40 to about 50% by weight of the total dry composition may be employed.

A dispersing aid such as lecithin may also be used in the composition of the present invention. Lecithin is the phospholipid complex commercially extracted from soybeans. Lecithin may also be extracted from other sources.

Lecithin has two functions in the present invention. The lecithin complexes with the whey protein and the monovalent ions to form a membrane around each fat globule. This membrane prevents agglomeration of the fat globules, thus stabilizing the emulsion and adding richness to the mouth feel. The membrane also provides a barrier against oxidation and rancidity development of the fat.

Lecithin also acts as an agent to wet or hydrate the whey protein absorption layer around the casein. This layer prevents agglomeration of the protein particles. Lecithin also aids the migration of monovalent ions upon the whey protein emulsoid layer surrounding the casein particle. The monovalent ions increase the electric charge upon the colloid particles allowing for increased repulsion. The increased charge exhibited by each colloid particle will further prevent agglomeration of the protein particles.

The prevention of agglomeration of the protein particles tends to keep the yogurt in a fluid state, and prevent precipitation, grain-like texture, and bitter after-taste in the final product.

Citrate or phosphate salts may also improve the whey protein emulsoid properties by increasing the charge on the emulsoid particles, but the salts may be eliminated from the formulation if the whey protein inherently has the correct level of such salts.

Lecithin is the dispersing aid of choice for the yogurt composition of the present invention because it more closely approximates the phospholipids naturally occurring in milk. Other dispersing aids such as monoglycerides, diglycerides, and mono and diglyceride combinations, citrate or phosphate salts may also be used.

The dispersing aid (e.g., lecithin) helps disperse the powder in the water when it is reconstituted. This dispersing aid is not essential, however, if the dry powder composition of the present invention is prepared by spray drying. This spray drying process would inherently provide the dry composition of the present invention with a structure which is so intermixed that the use of a dispersing agent would not be necessary.

The amount of dispersing aid useful in the present invention may vary widely but generally an amount of from about 0.1 to about 10, typically from about 0.3 to about 5, and preferably from about 0.5 to about 1.5% by weight of the total dried composition may be employed.

Non-fat dried milk may also be employed in the composition of the present invention unless it is desired that the consumer during the reconstitution process add either water and dried milk or liquid milk. The non-fat dried milk which is useful in the present invention is available commercially in powder form and it is preferably of a type that is almost instantly water soluble. For this purpose, there may be employed dried skim milk which has been dehydrated to form a concentrated liquid, then subjected to a second spray drying so as to aerate the milk powder, thereby rendering it quickly soluble. In practice, one may also use dried soy bean milk and even dried sour cream, but dried skim milk is preferred. An "instantized" milk would be suitable for purposes of the present invention.

The amount of dried milk may vary widely, but an amount of generally from about 0.1 to about 80, typically from about 1 to about 75, and preferably from about 5 to about 70% by weight based upon the weight of the total dried composition may be employed.

Drying agents, such as tricalcium phosphate, sodium aluminosilicate, silicon dioxide, aluminum calcium silicate, calcium silicate, tricalcium silicate, and sodium calcium aluminosilicate may also be added to the composition of the present invention in order to keep the particular material in free flowing form. Tricalcium phosphate is a preferred drying agent.

The amount of drying agent may vary widely, but an amount of generally from about 0.1 to about 5, typically from about 0.2 to about 2, and preferably from about 0.25 to about 0.75% by weight based upon the weight of the total dried composition may be employed.

Flavoring agents may also be employed in the composition of the present invention. The flavoring agent may be natural or artificial and is preferably one which imparts to the yogurt product a fruit-like flavor, such as Givaudan R 10.035, which simulates a strawberry taste. Dehydrated fruits such as apple flavor bits may also be employed.

When a natural flavoring agent is employed, it is preferred to use fructose as a sweetener because the fructose brings out natural fruit flavors to a greater extent than do other sweeteners.

The amount of flavoring agent may vary widely, but generally an amount of from about 0.1 to about 5, typically from about 0.3 to about 3.0, and preferably from about 0.5 to about 1.0% by weight based upon the total composition may be employed.

Coloring agents may also be used in the present invention. The coloring agent may be any acceptable coloring ingredient appropriate to the flavoring agent.

Thus, in the case of strawberry flavor, the appropriate coloring agent is FD and C Red 40.

The amount of coloring agent may vary widely, but an amount of generally from about 0.001 to about 1.0, typically from about 0.02 to about 0.5, and preferably from about 0.06 to about 0.1% by weight of the total composition may be used.

The composition of the present invention may be prepared by dry blending the individual ingredients. Any temperature or pressure for the dry blending step may be employed, but essentially ambient temperatures and pressures are preferred.

The ingredients of the composition of the present invention may be admixed in any apparatus well known to those skilled in this art. Although any means of admixing known to those skilled in this art may be employed, such as dry blending or spray drying, it is preferred that the ingredients of the composition of the present invention be admixed by spray drying using typical spray drying apparatus such as a Bowen spray dryer or a Niro dryer. Spray drying is preferred over, for example, dry blending, because some of the ingredients of the composition are in the liquid state. To be dry blended, they first must be dried. With spray drying, the blending and drying operations are carried out in a single operation. Spray drying is thus more economical than dry blending in the present invention.

The process for preparing the composition of the present invention may be conducted in a continuous, semi-continuous or batch manner as desired.

The composition of the present invention is packaged in an hermetically sealed envelope, such as a plastic-foil laminated envlope which is heat sealed to exclude air and moisture. So packaged, the preparation has an indefinite shelf life at ordinary room temperatures.

To use the preparation, the package seal is ruptured and the dry preparation poured into a container to which water and/or milk is added, the composition being thoroughly mixed for about fifteen seconds in a Waring blender until the yogurt drink of the proper consistency is formed. Should more yogurt drink be made than one may wish to consume at a sitting, it may be stored in a refrigerator in the same way as natural yogurt. The life of this prepared yogurt drink is no longer than that of the natural yogurt, however.

The present invention is further illustrated by the following example. All parts and percentages in the example as well as in the specification and the claims are by weight unless otherwise specified.

EXAMPLE

The following ingredients are dry-blended at room temperature and pressure by blending them in an J. H. Day dry blender or Bowen spray drying apparatus.

| Ingredient | Parts By Weight (Dry Weight Basis) |
| --- | --- |
| Freeze Dried Lactobacillus Culture | 0.03 |
| Dehydrated yogurt powder (deactivated) | 25.69 |
| Acid Whey | 20.16 |
| Citric Acid | 0.83 |
| Fructose | 25.19 |
| Locust Bean Gum | 1.52 |
| Tricalcium Phosphate | 0.51 |
| Lecithin and other fats | 1.01 |
| Sucrose | 20.16 |
| Carboxy methyl cellulose | 1.25 |
| Dehydrated Fruit | 2.93 |
| Natural and Artificial Flavor | 0.65 |

The above composition may be reconstituted by taking 28 grams of the dry powder and adding to it eight ounces of cold milk (1 to 1.5% fat). The mixture is vigorously stirred in a Waring Blender and is then ready for consumption. A natural tasting yogurt drink results.

The principles, preferred embodiments, and modes of operation of the present invention have been described in the foregoing specification. the invention which is intended to be protected herein, however, is not to be construed as limited to the particular forms disclosed, since these are to be regarded as illustrative rather than restrictive. Variations and changes may be made by those skilled in this art without departing from the spirit of the invention.

I claim:

1. An instant powdered composition which may be reconstituted to form a yogurt drink, said composition comprising a mixture of (a) from about 0.01 to about 5 percent by weight Lactobacillus culture, (b) from about 1 to about 35 percent by weight deactivated yogurt powder, (c) from about 0.1 to about 10 percent by weight of carboxy methyl cellulose, (d) from about 0.1 to about 20 percent by weight locust bean gum, and (e) from about 10 to about 50 percent by weight of a mixture of acid whey and citric acid based upon the weight of the total composition.

2. A process for preparing an instant powdered composition which may be reconstituted to form a yogurt drink, said process comprising admixing a mixture of (a) from about 0.01 to about 5 percent by weight Lactobacillus culture, (b) from about 1 to about 35 percent by weight deactivated yogurt powder, (c) from about 0.1 to about 10 percent by weight of carboxy methyl cellulose, (d) from about 0.1 to about 20 percent by weight locust bean gum, and (e) from about 10 to about 50 percent by weight of a mixture of acid whey and citric acid based upon the weight of the total composition.

* * * * *

UNITED STATES PATENT OFFICE
CERTIFICATE OF CORRECTION

Patent No. 4,289,789          Dated September 15, 1981

Inventor(s) Stanley D. Cajigas

It is certified that error appears in the above-identified patent and that said Letters Patent are hereby corrected as shown below:

Kindly change the name of the assignee on the cover of the patent from "M. P. FOOD TECHNOLOGY, INC., Fairfield, N.J." to --MILPAK, INC., Pinebrook, N.J.

Signed and Sealed this

Twenty-third Day of February 1982

[SEAL]

*Attest:*

GERALD J. MOSSINGHOFF

*Attesting Officer*  *Commissioner of Patents and Trademarks*